(12) United States Patent
Hague

(10) Patent No.: US 10,932,448 B2
(45) Date of Patent: Mar. 2, 2021

(54) PET CHEW AND TREAT MADE OF EXTRUDED MATERIAL

(71) Applicant: Frank Jay Hague, Colleyville, TX (US)

(72) Inventor: Frank Jay Hague, Colleyville, TX (US)

(*) Notice: Subject to any disclaimer, the term of this patent is extended or adjusted under 35 U.S.C. 154(b) by 368 days.

(21) Appl. No.: 15/845,521

(22) Filed: Dec. 18, 2017

(65) Prior Publication Data

US 2018/0235179 A1 Aug. 23, 2018

Related U.S. Application Data

(60) Provisional application No. 62/521,812, filed on Jun. 19, 2017, provisional application No. 62/461,971, filed on Feb. 22, 2017.

(51) Int. Cl.
| | |
|---|---|
| *A01K 15/02* | (2006.01) |
| *A23K 50/40* | (2016.01) |
| *C08L 3/02* | (2006.01) |
| *C08L 89/06* | (2006.01) |
| *A23K 10/26* | (2016.01) |

(52) U.S. Cl.
CPC ............ *A01K 15/026* (2013.01); *A23K 10/26* (2016.05); *A23K 50/40* (2016.05); *C08L 3/02* (2013.01); *C08L 89/06* (2013.01)

(58) Field of Classification Search
CPC .... A01K 15/026; A01K 15/025; A23K 50/40; A23K 10/26; C08L 3/02; C08L 89/06
See application file for complete search history.

(56) References Cited

U.S. PATENT DOCUMENTS

| | | | |
|---|---|---|---|
| 3,899,607 | A | 8/1975 | Miller et al. |
| 4,419,372 | A | 12/1983 | Greene et al. |
| 5,635,237 | A | 6/1997 | Greenberg |
| 5,894,029 | A | 4/1999 | Brown et al. |
| 5,897,893 | A | 4/1999 | Mohilef |
| 6,042,873 | A | 3/2000 | Lawson |
| 6,238,715 | B1 | 5/2001 | Baikie |
| 6,455,083 | B1 | 9/2002 | Wang |
| D485,046 | S | 1/2004 | Hague |
| D489,161 | S | 5/2004 | Hague |
| 6,827,041 | B2 | 12/2004 | Hague et al. |
| 6,886,497 | B1 | 5/2005 | Hague |
| 7,013,836 | B1 | 3/2006 | Hague et al. |
| D575,478 | S | 8/2008 | Hague |
| D575,926 | S | 9/2008 | Hague |
| D591,480 | S | 5/2009 | Hague |
| D594,182 | S | 6/2009 | Hague |
| 7,662,414 | B1 | 2/2010 | Lawlor |

(Continued)

*Primary Examiner* — Trinh T Nguyen
(74) *Attorney, Agent, or Firm* — Brian K. Yost; Decker Jones, PC

(57) ABSTRACT

A pet chew has an elongated tube having a wall extending between two ends. The tube has a length between the ends. The wall forms an interior cavity that extends along the length of the tube. The wall is made of extruded material of animal meat, animal skin and plant material such as starch and grain. The interior cavity is hollow. In one embodiment, each end of the tube is tied into a knot, with the tube forming a central shank extending between the knots. In another embodiment, a wrap is located around the exterior of the tube. The wrap has a different appearance than the tube. In still another embodiment, plural tubes are provided, which tubes are braided about each other.

12 Claims, 8 Drawing Sheets

(56) References Cited

U.S. PATENT DOCUMENTS

| | | |
|---|---|---|
| 7,677,203 B2 | 3/2010 | Stern |
| 7,691,426 B2 | 4/2010 | Axelrod et al. |
| D631,636 S | 2/2011 | Hague |
| 7,976,884 B2 | 7/2011 | Weinberg |
| 8,455,025 B2 | 6/2013 | Stern et al. |
| 8,479,687 B2 | 7/2013 | Anderson et al. |
| 8,697,174 B2 | 4/2014 | Teconchuk et al. |
| 9,044,039 B2 | 6/2015 | Xu |
| 9,089,108 B2 | 7/2015 | Anderson et al. |
| 2004/0197455 A1 | 10/2004 | Nie et al. |
| 2005/0145193 A1 | 7/2005 | Kirch |
| 2005/0153040 A1 | 7/2005 | Axelrod et al. |
| 2005/0214349 A1 | 9/2005 | Nie et al. |
| 2006/0165854 A1 | 7/2006 | Levin et al. |
| 2006/0188611 A1 | 8/2006 | Unlu et al. |
| 2006/0233923 A1 | 10/2006 | Campbell |
| 2007/0113796 A1 | 5/2007 | Schildgen et al. |
| 2007/0289552 A1 | 12/2007 | Axelrod et al. |
| 2007/0292594 A1 | 12/2007 | Levin |
| 2010/0258970 A1 | 10/2010 | Axelrod et al. |
| 2011/0139087 A1 | 6/2011 | Lang et al. |
| 2012/0085296 A1 | 4/2012 | Stern |
| 2013/0142936 A1 | 6/2013 | Stern et al. |
| 2014/0137810 A1 | 5/2014 | Stern |
| 2014/0290587 A1 | 10/2014 | Dixon |
| 2016/0353772 A1 | 12/2016 | Stern |

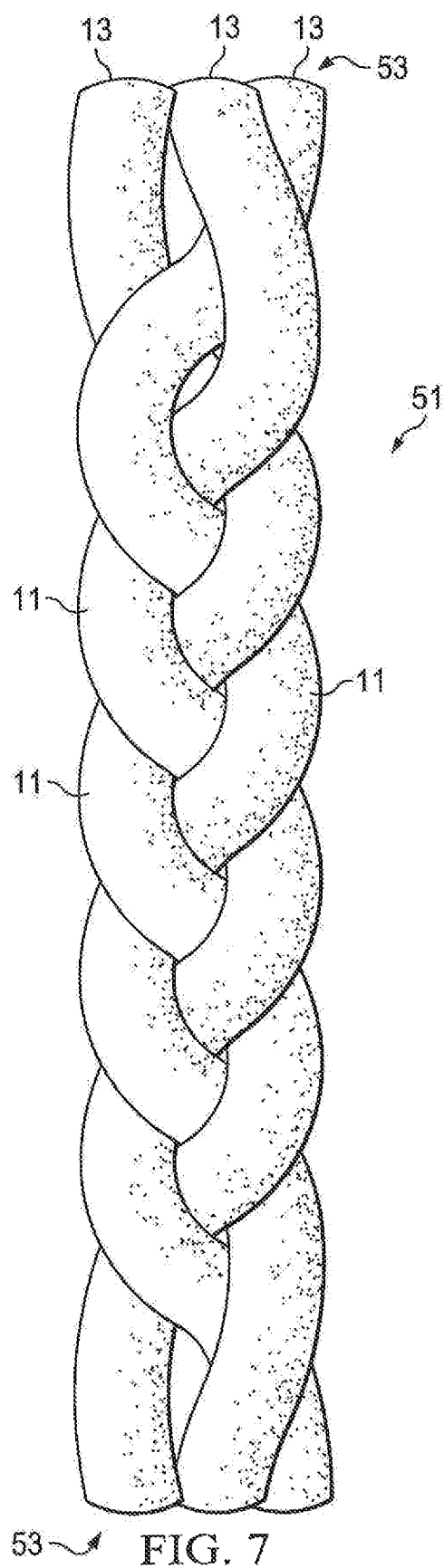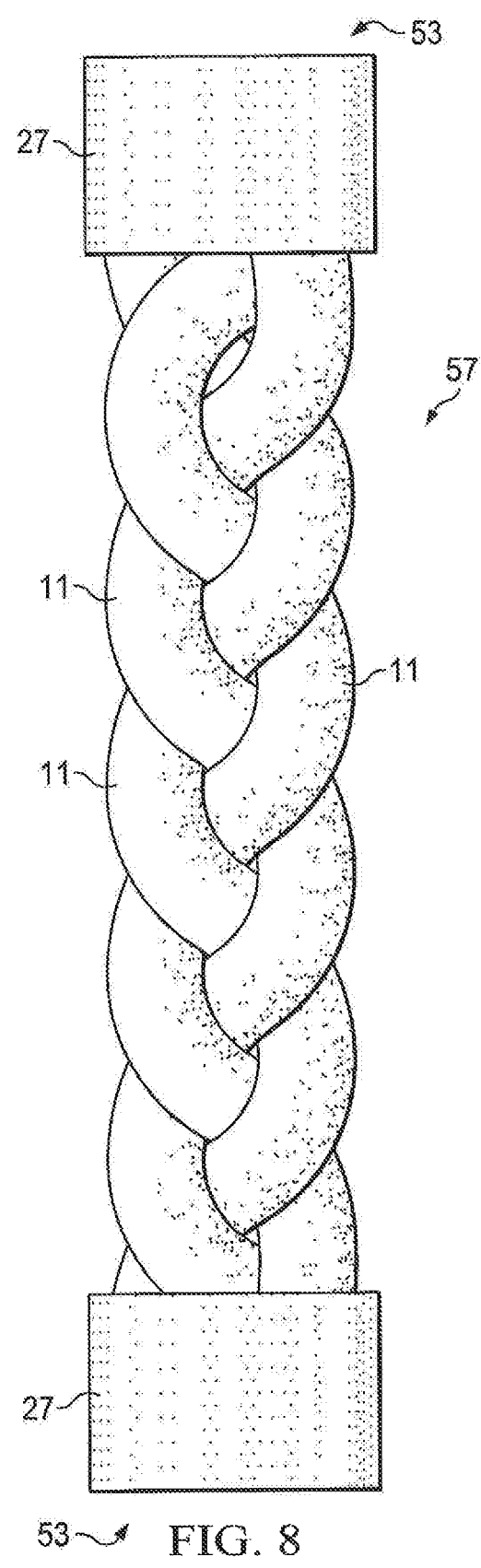

PET CHEW AND TREAT MADE OF EXTRUDED MATERIAL

FIELD OF THE INVENTION

The present invention relates to pet chews and treats such as are given to dogs and other animals.

BACKGROUND OF THE INVENTION

Dog treats and chews are given to dogs for a variety of reasons. Dog chews are used to help clean the teeth of dogs. Dog treats may have the same cleaning function, as well as provide nutritional value.

Many dog chews and treats are made from rawhide, which is untanned cow skin. The skin is dehaired and cleaned of fat and muscle. The rawhide may be bleached with hydrogen peroxide to improve its appearance. The skin is then manipulated into the desired shape, such as by folding or rolling, and dried.

The problem with rawhide is that it is indigestible, being essentially leather. Dogs lack, the enzymes needed to digest the rawhide. When a dog chews rawhide, pieces can break off and lodge in the dog's digestive tract. In some cases, an occlusion, or blockage, as well as impaction, occurs, requiring veterinary attention. Furthermore, rawhide is low in palatability, so that dogs quickly lose interest in it.

An alternative to rawhide chews and treats are pigskin products. Pigskin is digestible and has some nutritional value. Pigskin stimulates the dog's gastro-intestinal tract to produce digestive enzymes. Thus, pieces that enter the digestive tract of dogs do not cause problems.

Furthermore, pigskin is generally used for other products other than pet chews and treats. The production of leather creates leftovers or scraps of skin that can be used for colloidal protein and for making pet supply products.

While pigskin has some nutritional value, many pet owners desire chews and treats to be more nutritious. The use of plant material allows for an increase in nutritional value.

Pet treats made of dried animal skin are typically rolled or pressed into shape. Once the skin dries, the skin retains the shape. For example, the skin may be rolled into a cylinder. The ends of the cylinder are then knotted to form a bone shape. Many dogs have difficulty in chewing such a stiff, dense treat.

SUMMARY OF THE INVENTION

The present invention provides a knotted bone pet chew, comprising an elongated tube having a wall extending between two ends. The tube has a length between the ends, with the wall forming an interior cavity that extends along the length of the tube. The wall is made of extruded material. The interior cavity is hollow. Each end of the tube tied into a knot. The tube forms a central shank extending between the knots.

In one aspect, the tube is flattened at the knots and unflattened at the shank.

In another aspect, a wrap is located about the shank.

In another aspect, the wrap comprises animal skin.

In another aspect, the wrap comprises animal material and plant material.

In another aspect, the elongated tube is a first tube, further comprising a second hollow tube coupled to the first tube.

In another aspect, the first and second tubes form a figure "8" in transverse cross-section.

The present invention also provides a pet chew, comprising plural elongated tubes. Each tube has a wall extending between two ends. Each tube has a length between the ends. Each wall forms an interior cavity that extends along the length of the respective tube. The respective wall is made of extruded material, with the respective interior cavity being hollow. The tubes are braided about each other.

In one aspect, the pet chew has braided ends, further comprising a wrap located about at least one of the braided ends.

In another aspect, one of the tubes has a first appearance and another of the tubes has a second appearance that is different from the first appearance.

In another aspect, one of the tubes has a first flavor and another of the tubes has a second flavor that is different from the first flavor.

In another aspect, a third one of the tubes one of the tubes has a third flavor that is different from the first flavor and the second flavor.

The present invention also provides a pet chew, comprising an elongated tube having a wall extending between two ends. The tube has a length between the ends. The wall forms an interior cavity that extends along the length of the tube. The wall is made of extruded material. The interior cavity is hollow. The tube has a first appearance. A wrap is located about an outside of the tube. The wrap has a second appearance that is different than the first appearance.

In one aspect, one of the tubes has a first flavor and another of the tubes has a second flavor that is different from the first flavor.

In another aspect, the wrap comprises animal skin.

In another aspect, the wrap comprises animal material and plant material.

The present invention also provides a pet chew, comprising an elongated tube having a wall extending between two ends. The tube has a length between the ends. The wall forms an interior cavity that extends along, the length of the tube. The interior cavity is hollow. The wall comprising ground animal skin, ground animal meat and plant material mixed together and extruded.

In one aspect, the wall comprises 10-15% animal skin, 25-35% animal meat, 25-35% starch and 5-15% by weight.

BRIEF DESCRIPTION OF THE DRAWINGS

FIG. 7 shows a pet chew in the shape of a braid, made from extruded hollow tubes of FIG. 1.

FIG. 8 shows the braid pet chew in accordance with another embodiment.

DESCRIPTION OF THE PREFERRED EMBODIMENTS

Figure 1:
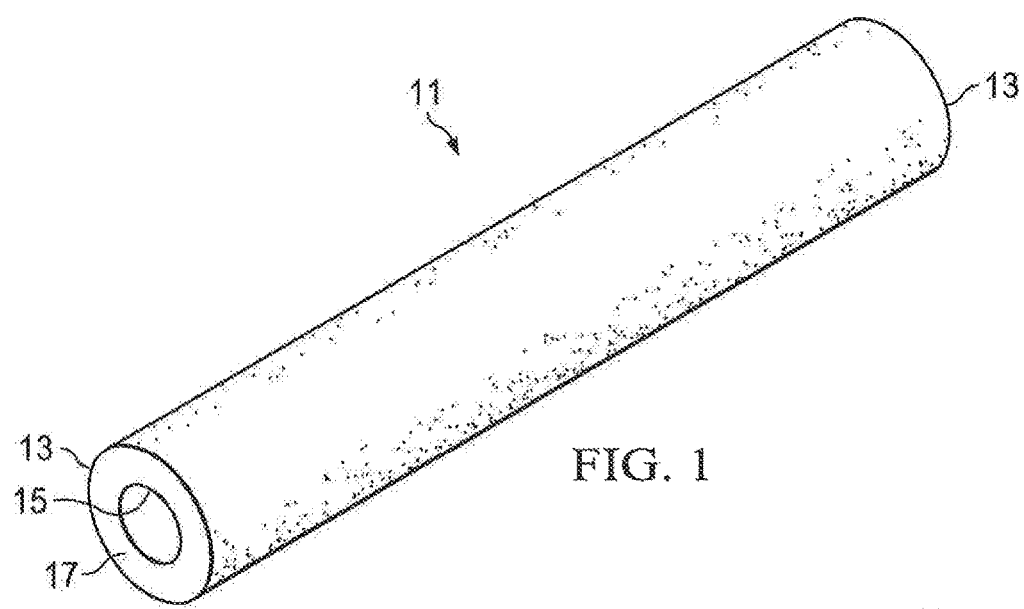
FIG. 1 is a perspective view of an extruded hollow tube, in accordance with a preferred embodiment.

The present invention provides a chew or treat material extruded in tubular form, which tube is then tied or manipulated into various shapes, such as knotted bones or braids. The extrusion is then allowed to dry and harden, thereby retaining its shape.

The extrusion is nutritious, palatable and digestible for animals such as dogs. The extrusion uses animal meat, animal skin and plant material. The plant material provides a binder to keep the ingredients together during chewing, allowing the animal to enjoy the chew for a period of time.

The tube is hollow. This is unlike the prior art, which either uses rolled sheets or fills cavities with a material that resembles bone marrow. The use of a hollow tube adds to the overall chewability of product. A hollow tube is more apt to "give" as an animal bites down, increasing the life of the chew. In addition, the hollowness of the chew allows for cleaning of the animal's teeth. Once the teeth penetrate the hollow wall, the teeth are cleaned to the gum. In particular, mature dogs and puppies have strong jaws, but weak teeth. These dogs are able to more easily break off a piece of the chew and chew the piece until small enough to safely swallow. Some prior art chews break off in large pieces, and present a choking hazard to the dog as the dog tries to swallow the piece whole. The use of a hollow member also increases the overall size of the chew, making the chew easier for an animal to hold and chew.

The animal meat and skin increase the palatability of the chew. The animal skin is pig skin, which is easily digestible for animals. Cattle rawhide is indigestible for most pets.

In the description that follows, all percentages are given by weight. Also, "pet chew" and "pet treat" are used interchangeably. Like reference numbers in different embodiments denote like elements.

The extrusion formula contains the following ingredients: plant material and animal material. In a preferred embodiment the formula contains plant material of up to 35-60%. The plant material can be grains, seeds, stems, leaves, or processed materials obtained therefrom. Examples of such plant material include corn, rice, wheat, sweet potatoes, and processed materials. In the preferred embodiment, such plant material comprises corn, corn starch, rice powder, barley malt syrup, fructose and saccharide (such as isomalto-oligosaccharide). Corn starch makes up the bulk, of the plant material. For example, if the amount of plant material in the extrusion is 40%, the amount of corn starch is 25-35%. As another example, if the amount of plant material in the extrusion is 45-50%, the amount of corn starch is 35-45%. The plant material is a powder or liquid or both.

The animal material can be animal skin, or animal meat, or a combination of both. The animal skin is preferably pig skin. Pig skin is digestible and has some nutrition. The pigskin can be fresh or preserved. Fresh pigskin is recently removed, from the pig. Other than a liming step used to ease hair removal, no other processing has occurred. Preserved pigskin is skin removed from the pig, processed to some degree and then preserved by drying, salting, etc., in order to prevent deterioration. Alternatively, the pigskin can be in various other stages of freshness or preservation.

The pig skin is processed to produce a bleached and expanded product. This processed skin is low in oil, light in color and uniform in appearance. Because the oil content of the skin is greatly reduced, products made with the skin have a longer shelf life. In addition, the processed skin is highly palatable to dogs and is chewable and digestible. The bleached and expanded processing is described in more detail in U.S. Pat. Nos. 6,827,041 and 7,013,838, the full disclosures of which are incorporated herein by reference.

The pig skin is dried and ground to a small particle size. In the preferred embodiment, the pig skin is ground to a powder, to make a smooth, creamy extrusion.

The pig skin component can be completely made of bleached expanded pig skin. Alternatively, an amount of natural (unbleached, unexpanded) pig skin can be mixed in. For example the pig skin component can be half bleached, expanded pig skin and half natural pig skin. The natural pig skin has oils that produce a darker color in the extrusion. The natural pig skin is cleaned and stabilized in accordance with conventional techniques so it will not deteriorate.

The amount of pig skin component used in the formulation can range from 10-33%, if the pig skin component is above 33%, the extrusion loses cohesiveness and comes apart. Pig skin adds protein to the formulation. The higher the pig skin content, the higher the protein. Pig skin also adds to the suitability of the texture of the extruded material.

The pig skin is ground to a fine particle size. Due to the fiber-like nature of the skin, the ground skin is not a powder that pours, but has more of a lint-like texture. The particles tend to clump together.

As an optional component, animal meat can be added to the formulation to further increase palatability. Examples of animal meat are chicken, other fowl, beef, crocodile, etc. A typical amount of animal meat is 5-30%. The animal meat is dried and ground to a powder. Alternatively, the meat can be ground wet.

One formulation is: pig skin 25-33%, chicken 15-25%, corn starch 25-35%, other ingredients 15-25%. Another formulation is: pig, skin 0-15%, chicken 25-35%, corn starch 35-45%, other ingredients 10-20%. Still another formulation is: pig skin 10-15%, chicken 25-35%, corn starch 25-35%, rice powder 5-15%, other ingredients 10-20%.

To make the extrusion, the ingredients are mixed together. The plant material, the pig skin component and any animal meat are mixed together. Some additives may be mixed in as well to provide the desired consistency and shelf life. For example, some gelatin may be mixed in. A coloring agent or dye may be used as well. As discussed above, the use of the bleached, expanded pig, skin produces a light, almost white, colored product. Adding natural pig skin darkens the color. Adding colorants will also darken the color to a light brown or a dark brown. Non-brown colorants can be used as well. For example, green and red are popular in pet treats and chews. Another additive is flavoring. Various flavorings can be used such as milk powder and peanut butter. Animal meat, such as chicken, beef, lamb or pork, can be used as a flavoring.

Figure 12:
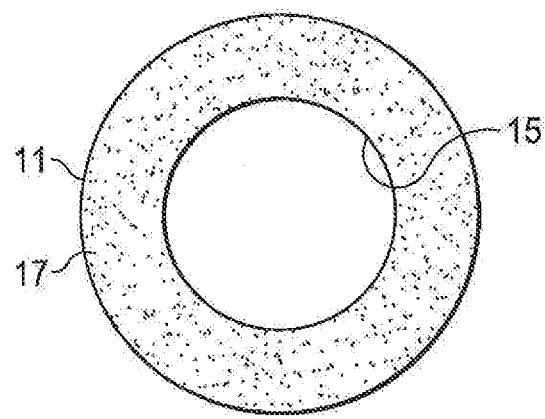
FIG. 12 is a cross-sectional view of the pet chew of FIG. 2, taken through lines XII-XII.

The mixed ingredients are then extruded through a die plate. In one embodiment, the extrusion is in the shape of a cylindrical hollow tube 11 (see FIG. 1), In transverse cross-section, the tube is a circular ring. However, the tube can be other shapes such as a hollow square or rectangle in cross-section or a hollow oval in cross-section or a hollow triangle in cross-section. The cross-sectional shape of the cavity need not be the same shape as the exterior of the tube. The outer surface of the tube can be smooth. Alternatively, the outer surface can be textured with a design, such as one or more grooves that extend in a spiral manner along the length of the tube. The tube is cut to a length extending between two ends 13. The tube has an interior cavity 15 extending along the length from end to end 13. Thus, the tube is hollow. The tube has a wall 17 surrounding the cavity. The wall 17 has a thickness that is consistent along the length of the tube. By way of example, the outside diameter can range from 8 mm to 23 mm, while the inside diameter can be 2-8 mm. In general, the larger the pet chew, the thicker the wall diameter to maintain structural integrity of the product before being given to an animal to chew. In the preferred embodiment, the tube is circular in transverse cross-section (see FIG. 12). The tube is seamless, due to the extrusion process. Also, in the preferred embodiment, the tube wall 17 has a single layer.

Figure 2:
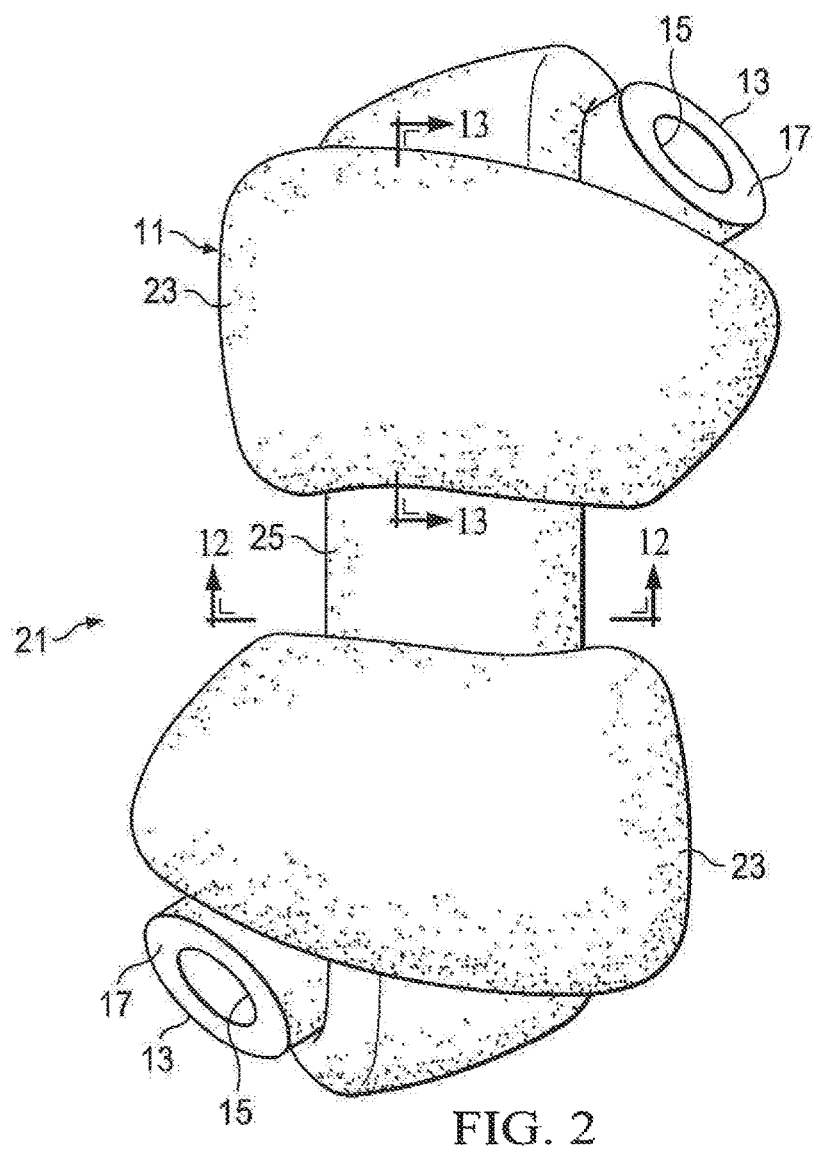
FIG. 2 is a perspective view of a pet chew in the shape of a bone, made from the extrusion of FIG. 1.
Figure 13:
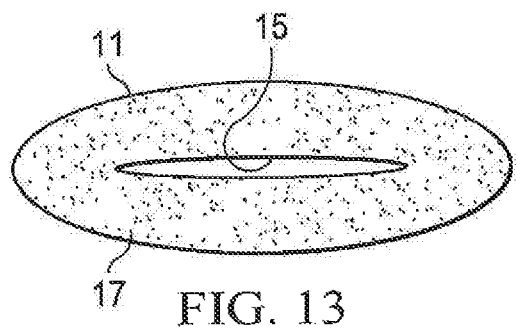
FIG. 13 is a cross-sectional view of the pet chew of FIG. 2, taken through lines XIII-XIII.
Figure 14:
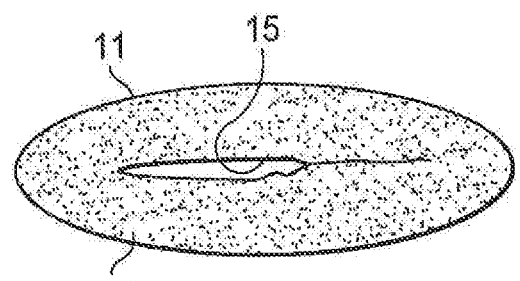
FIG. 14 is another embodiment of the pet chew of FIG. 12.

At this stage, after extrusion, the hollow tube is flexible and pliable and capable of manipulation. The hollow tube 11 is used to make a number of different pet chews. One type of pet chew is a knotted bone. The hollow tube 11 is tied into a knotted bone 21, as shown in FIG. 2. The ends of the tube are each tied in an overhand knot 23. The hollow tube 11 allows ease in tying the knots. Between the knots is a shank portion 25. Along the shank 25, the tube is circular in transverse cross-section. (see FIG. 12). At the knots 23, the tube flattens somewhat due to pressure from the knots. FIGS. 2 and 13 illustrate this, with the flattened tube being larger at the knots than the tube at the shank. The interior cavity 37, which is hollow and filled with air, is deformed and, flattened. FIG. 14 shows another embodiment of the flattened tube, where the interior cavity is partially closed. The interior cavity can be partially closed or wholly closed at the knot. The ends 13 of the tube can be trimmed, so as not to protrude beyond the knots too much.

The size of the bone can be varied by changing the length of the tube and thus the shank and by changing the outside diameter of the tube. FIG. 2 shows a short bone, while FIG. 3 shows a longer bone.

Figure 3:
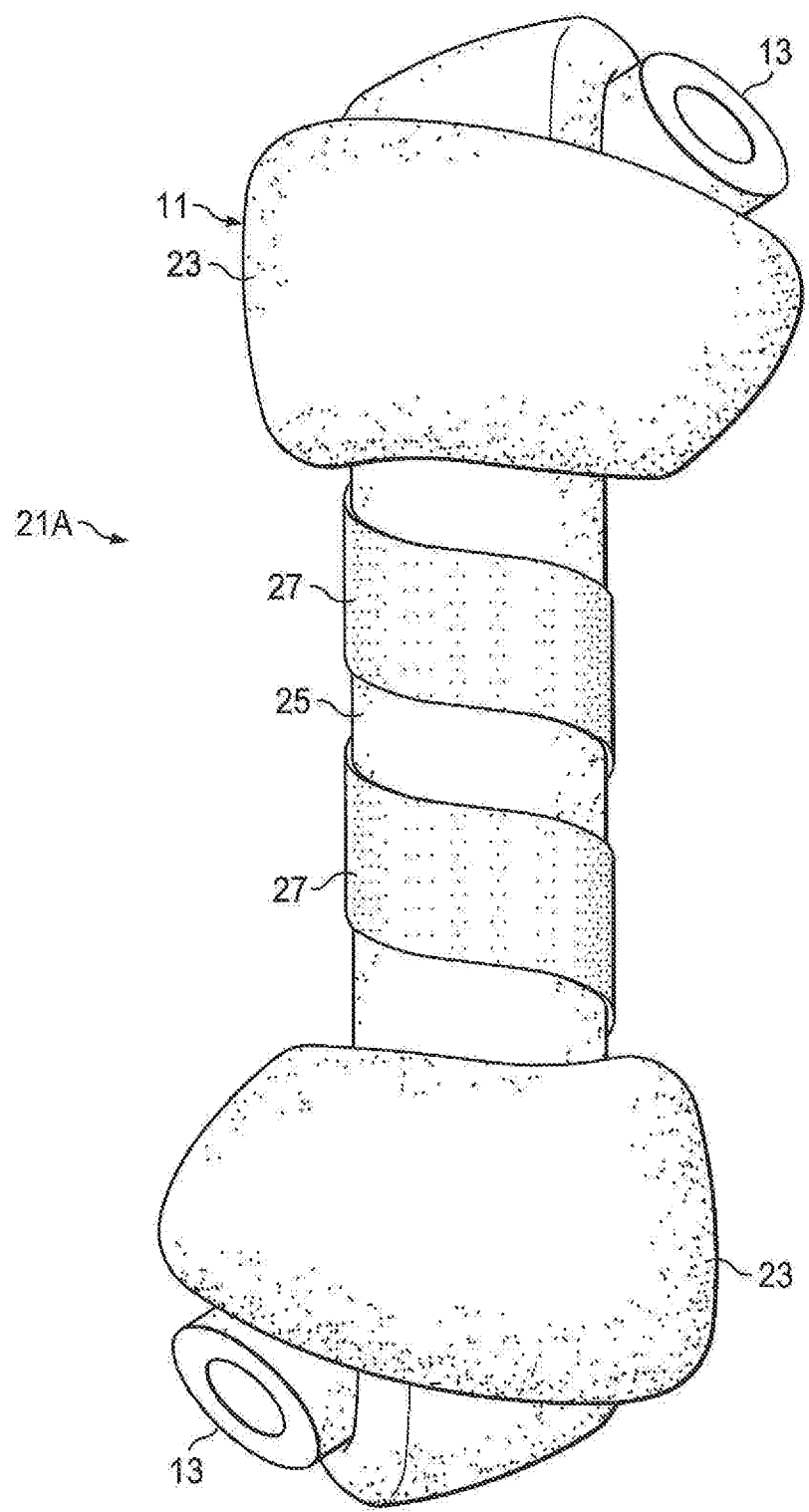
FIG. 3 shows the bone pet chew in accordance with another embodiment.

FIG. 3 also shows a variation of the knotted bone 21A. The outside of the shank 25 is wrapped with a layer or strip 27. The strip enhances palatability of the product or appearance of the product or both. For the embodiment of FIG. 3 and the other embodiments, the strip 27 can be of pig skin 27, such as the bleached expanded pig skin, or unbleached and unexpanded pig skin. Alternatively, the strip 27 can be other animal skin, although cow rawhide is generally disfavored because of difficulty in digestion. The skin in the outer wrap 27 is not ground, but rather in whole form, so that it can be wrapped. Alternatively, the strip 27 can be made of the extruded material used to make the tubes. The formulation of the material in the strip 27 need not be identical to the formulation of the material used in the tube, as some variation may occur. The strip 27 can be a different color than the tube for visual contrast. The strip 27 can also have a different flavor than the tube. In all of the embodiments, the strip 27 can be an outer wrap that is wrapped in a spiral, as shown. With such a spiral wrap, portions of the extruded material in the shank tube are visible. Alternatively, the outer wrap 27 can wrap around substantially most of the shank, from one knot to the other.

Figure 4:
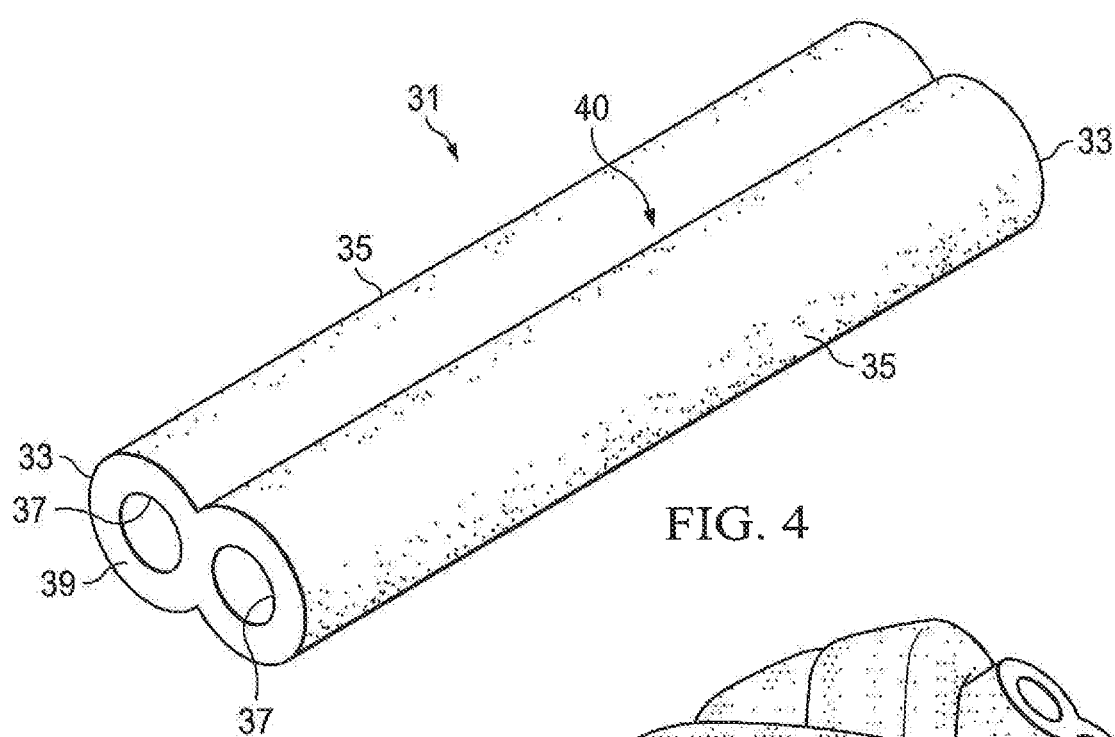
FIG. 4 is a perspective view of an extruded hollow tube arrangement, in accordance with another embodiment.

FIG. 4 shows another embodiment of the extrusion 31. The extrusion 31 is cut to a length extending between two ends 33. The extrusion forms plural hollow tubes 35, each of which has an interior cavity 37 extending along the length from end to end. Thus, the tubes are hollow. The tubes have a wall 39 surrounding the cavities. In transverse cross section, the extrusion is shaped like a figure "8". The wall between the cavities 37 is common to both tubes. The tubes are joined together along their lengths. A furrow 40 is created on each of the two sides where the two tubes join together at the common wall. The furrows 40 extend between the ends 33.

Figure 5:
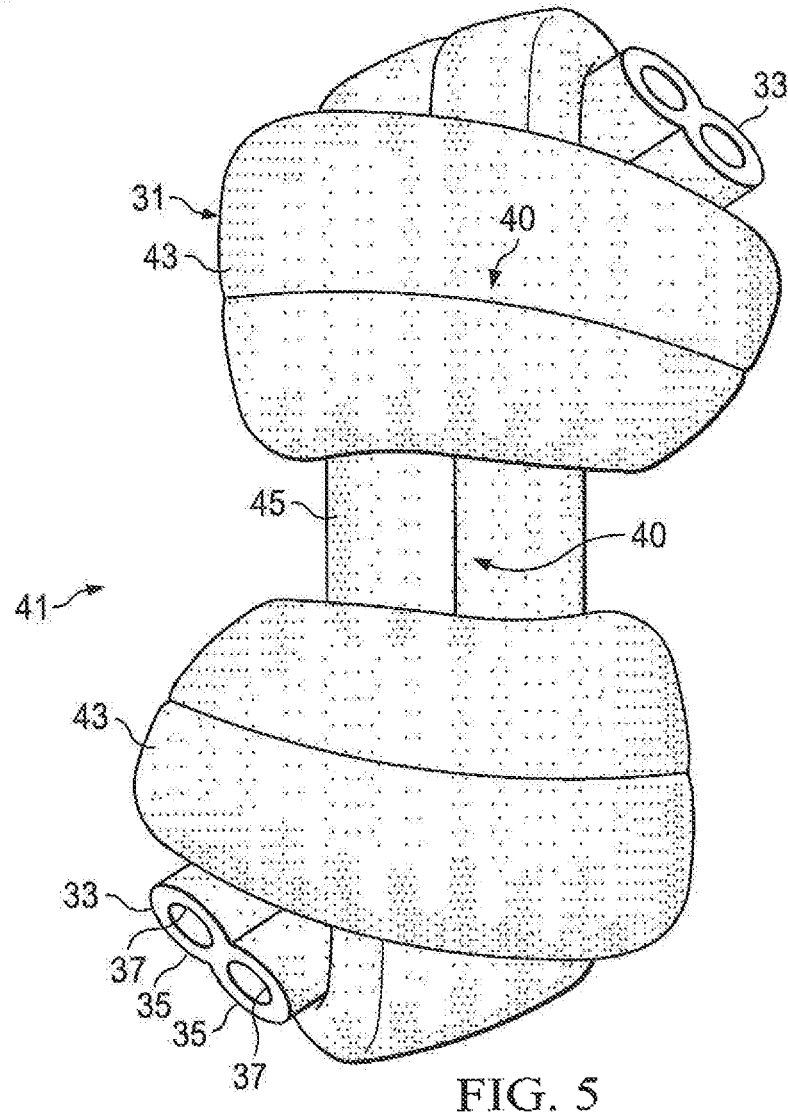
FIG. 5 shows a bone pet chew using the tube arrangement of FIG. 4.

FIG. 5 shows a knotted bone 41 made with the extrusion 31 of FIG. 4. The ends of the extrusion 31 are each tied in an overhand knot 43. The hollow tubes of the extrusion 31 allow ease in tying the knots. Between the knots is a shank portion 45. Along the shank, the extrusion 31 is shaped like a figure "8" in transverse cross-section. At the knots 43, the extrusion flattens somewhat due to pressure from the knots. FIG. 5 illustrates this, with the flattened extrusion being larger at the knots than the extrusion at the shank. The flattened extrusion is such that the depth of the furrows 40 is greatly minimized. The ends 33 of the extrusion can be trimmed, so as not to protrude too much.

Figure 6:
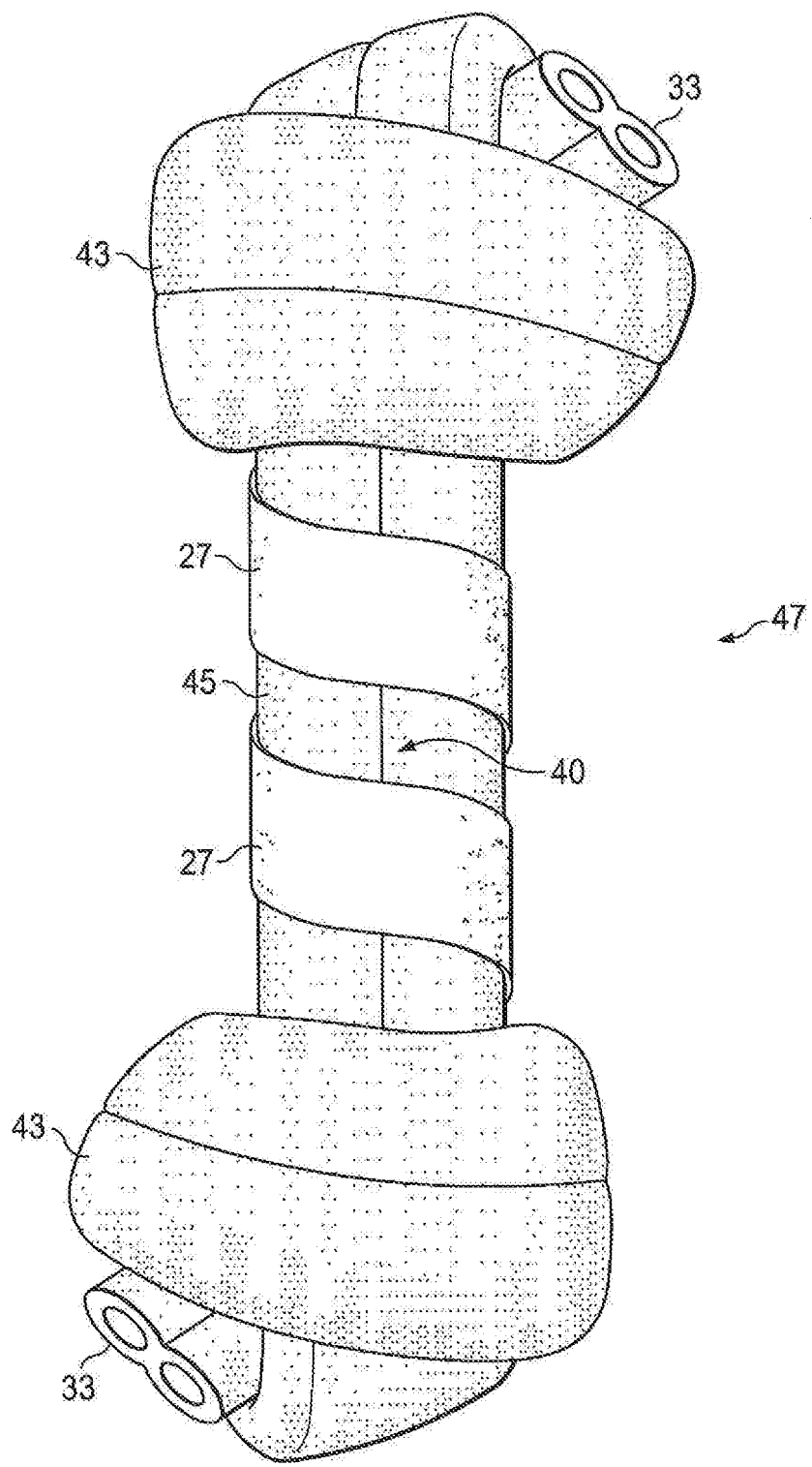
FIG. 6 shows a bone pet chew the tube arrangement of FIG. 4, in accordance with another embodiment.

FIG. 6 shows a knotted hone 47 that is a variation of the bone 41 of FIG. 5. The outside of the shank 45 is wrapped with a layer or strip 27, discussed above in more detail with respect to FIG. 3.

FIG. 7 is a braided pet chew 51 that uses plural of the hollow tubes 11. The chew shown in FIG. 7 has Three hollow tubes 11, braided together along their length. The chew has to ends 53. In transverse cross-section, the hollow tubes 11 are somewhat flattened due to the pressure of the braids.

FIG. 8 shows the braided pet chew 57 in accordance with another embodiment. Animal skin wraps 27 are applied to the end portions of the braid.

FIGS. 5-8 illustrate a pet chew made with plural hollow tubes. The number of tubes can be two or more. In FIGS. 5 and 6, the hollow tubes are joined together, sharing a wall. In FIGS. 7 and 8, the hollow tubes do not share a wall and are individual tubes before being manipulated into the chew.

Figure 9:
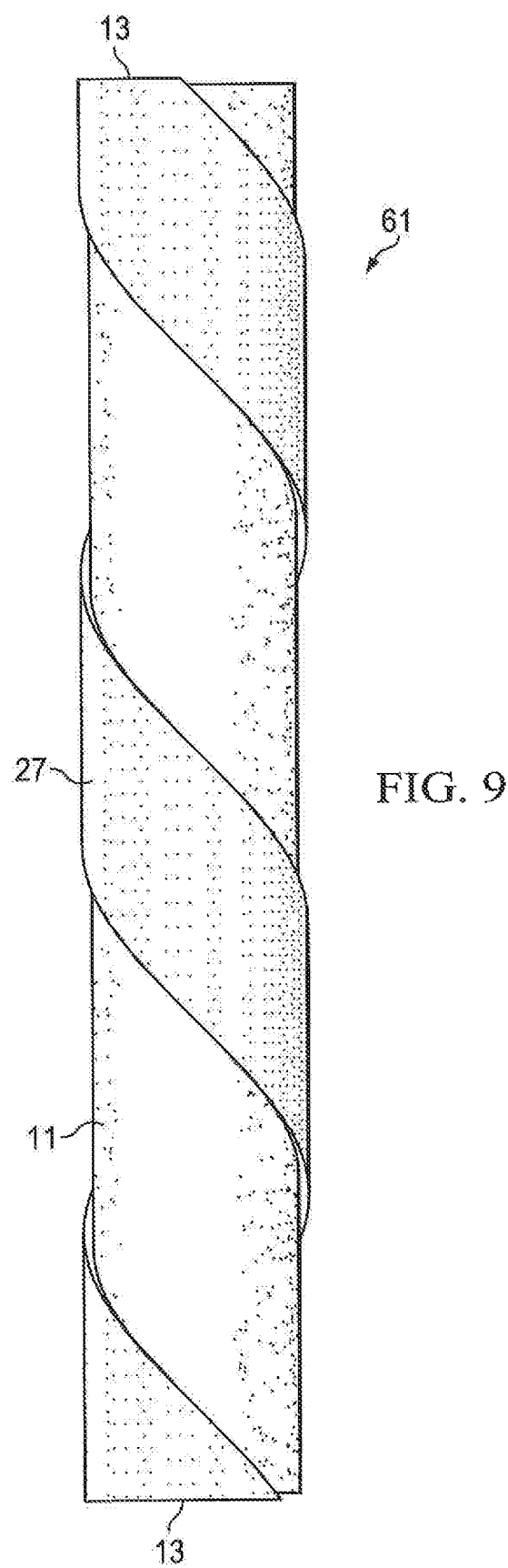
FIG. 9 shows a pet chew in accordance with another embodiment, made from the extruded hollow tube of FIG. 1.

FIG. 9 shows another pet chew 61. It has a hollow tube 11 cut to a length between two ends 13. Animal skin 27 is wrapped around the outside of the hollow tube.

Figure 10:
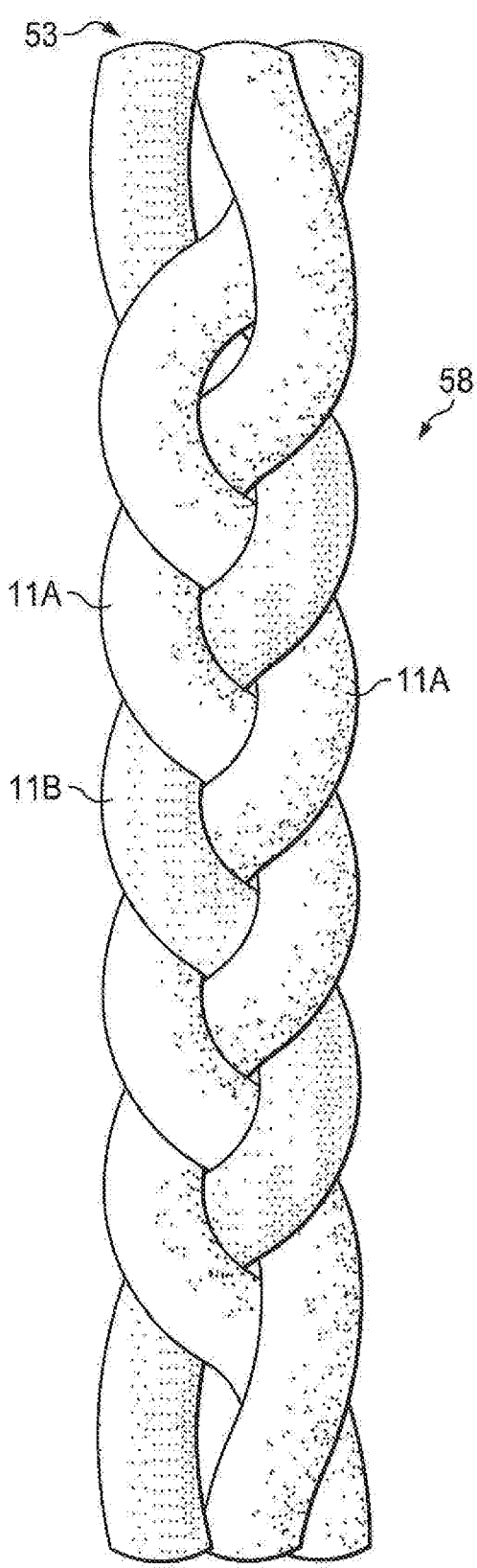
FIG. 10 shows the braid pet chew in accordance with another embodiment.

FIG. 10 shows another embodiment of the braided pet chew 58. The chew has three hollow tubes 11A, 11B, braided together along their length in the same manner as the braided pet chew shown in FIG. 7. Two of the three tubes 11A are the same. One of the tubes 11B is different in appearance, having a darker color relative to the other, light colored tubes 11A. This provides a visual contrast and unique appearance. In one embodiment, the two tubes 11A are pale or whitish in color and the other tube is brown or tan. The tubes can also be flavored differently, with the lighter tubes 11A of one flavor and the darker tube 11B of another flavor.

Figure 11:
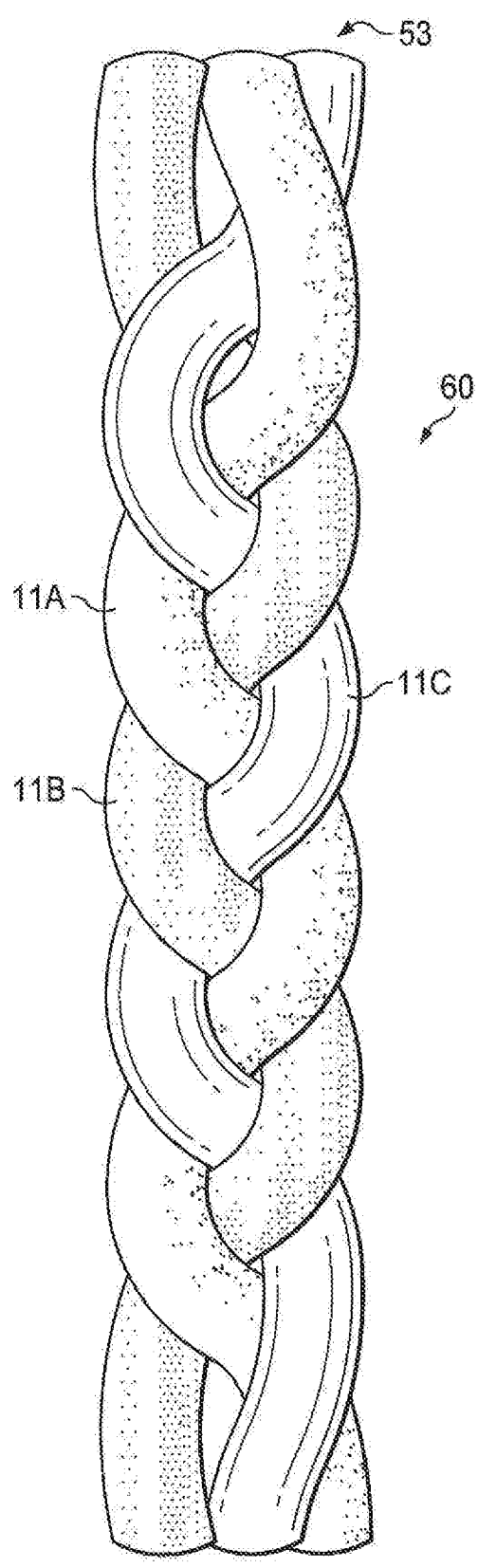
FIG. 11 shows the braid pet chew in accordance with another embodiment.

FIG. 11 shows another embodiment of the braided pet chew 60. The chew has three hollow tubes 11A, 11B, 11C, braided together along their length in the same manner as the braided pet chew shown in FIG. 7. The three tubes have a different appearance. One of the tubes 11A is lighter in color than the other tubes. Another of the tubes 11C is darker in color than the other tubes. The third tube 11B is in between the other two tubes 11A, 11C in color. This provides a visual contrast and unique appearance. In one embodiment, one tube 11A is pale or whitish in color, another tube 11B is a light tan and the third tube 11C is a dark brown. The tubes can also be flavored differently.

Each of the chews in FIGS. 10 and 11 have two ends 53. In transverse cross-section, the hollow tubes 11A, 11B and 11C are somewhat flattened due to the pressure of the braids. Although not shown, the braided chews of FIGS. 9 and 10 can have the ends wrapped with strips 27.

Once the product is shaped to satisfaction, and if a wrap 27 is to be applied, the wrap is actually applied, the product is then dried. Drying may occur in an oven. Drying sets the extrusion and the animal skin so that the product retains its shape. Drying also extends the shelf life of the product. Drying increase the work involved in chewing the product.

When chewed, the hollowness of the cavities 15, 37 in the tubes provide a resiliency that is pleasing to dogs. The teeth of dogs penetrate the wall 17, 39 allowing the dried extruded material to clean the teeth to the gums. In addition, a dog can break off a piece of the chew more easily and then chew that piece into a smaller piece. Thus, the choking hazard is minimized.

The foregoing disclosure and showings made in the drawings are merely illustrative of the principles of this invention and are not to be interpreted in a limiting sense.

The invention claimed is:

1. An extruded pet chew, comprising:
a) Plural elongated tubes, each tube having a wall extending between two ends, each tube having a length between the ends, each wall forming an interior cavity that extends along the length of the respective tube, the respective wall made of extruded material, the respective interior cavity being hollow, the wall being unsupported inside of the interior cavity, wherein the tube wall can collapse when a pet chews the tube;
b) The tubes braided about each other;
c) wherein one of the tubes has a first flavor and another of the tubes has a second flavor that is different from the first flavor.

2. An extruded pet chew, comprising:
a) plural elongated tubes, each tube having a wall extending between two ends, each tube having a length between the ends, each wall forming an interior cavity that extends along the length of the respective tube, the respective wall made of extruded material, the respective interior cavity being hollow;
b) the tubes braided about each other;
c) wherein the pet chew has braided ends, further comprising a wrap located about at least one of the braided ends;
d) wherein one of the tubes has a first flavor and another of the tubes has a second flavor that is different from the first flavor.

3. The extruded pet chew of claim 1 wherein one of the tubes has a first appearance and another of the tubes has a second appearance that is different from the first appearance.

4. The extruded pet chew of claim 1 wherein a third one of the tubes has a third flavor that is different from the first flavor and the second flavor.

5. The extruded pet chew of claim 1 wherein each of the walls comprises ground animal meat and plant material mixed together and extruded.

6. The extruded pet chew of claim 1 wherein each of the walls comprises ground animal skin, ground animal meat and plant material mixed together and extruded.

7. The extruded pet chew of claim 6 wherein each of the walls comprises 10-15% animal skin, 25-35% animal meat, 25-35% starch and 5-15% grain, all by weight.

8. The extruded pet chew of claim 6 wherein the extruded material comprises at least one flavoring selected from the group consisting of milk, peanut butter and animal meat.

9. The extruded pet chew of claim 1 wherein the extruded material comprises at least one flavoring selected from the group consisting of milk, peanut butter and animal meat.

10. The extruded pet chew of claim 1 comprising at least three tubes in a simple braid.

11. An extruded pet chew, comprising:
a) Two or more tubes; having a length and braided about each other;
b) At least two of the tubes having a tubular wall made of extruded material, the tubular wall having an interior surface and an exterior surface, the exterior surface exposed so that a pet can contact the exterior surface directly with teeth, the one tube having an interior cavity extending the length of the one tube;
c) The interior cavity extending uninterrupted about the interior surface, the interior cavity being hollow;
d) wherein one of the tubes has a first flavor and another of the tubes has a second flavor that is different from the first flavor.

12. An extruded pet chew comprising:
a) At least three tubes each having a length and braided about each other;
b) Each tube having a tubular wall made of extruded material, the tubular wall having an interior surface and an exterior surface, the exterior surface exposed so that a pet can contact the exterior surface directly with teeth, the tubular wall having a single interior cavity, the interior cavity being hollow;
c) wherein one of the tubes has a first flavor and another of the tubes has a second flavor that is different from the first flavor.

* * * * *